United States Patent [19]
Yu

[11] Patent Number: 5,222,329
[45] Date of Patent: Jun. 29, 1993

[54] ACOUSTICAL METHOD AND SYSTEM FOR DETECTING AND CONTROLLING CHEMICAL-MECHANICAL POLISHING (CMP) DEPTHS INTO LAYERS OF CONDUCTORS, SEMICONDUCTORS, AND DIELECTRIC MATERIALS

[75] Inventor: Chris C. Yu, Boise, Id.

[73] Assignee: Micron Technology, Inc., Boise, Id.

[21] Appl. No.: 858,094

[22] Filed: Mar. 26, 1992

[51] Int. Cl.$^5$ .............................................. B24B 49/00
[52] U.S. Cl. ............................. 51/165.77; 51/165.76; 51/165.92
[58] Field of Search ............ 51/281 R, 283 R, 165.76, 51/165.77, 165.92, 118, 131.1

[56] References Cited

U.S. PATENT DOCUMENTS

| | | | |
|---|---|---|---|
| 3,880,028 | 4/1975 | Frederick, Jr. | 83/74 |
| 3,897,659 | 8/1975 | Henry | 51/165.75 |
| 4,656,868 | 4/1987 | Azuma | 83/72 |
| 4,736,625 | 4/1988 | Patterson | 73/104 |
| 4,744,348 | 5/1988 | Oda | 51/165.77 |
| 4,821,460 | 4/1989 | Wegmann | 51/165.77 |

Primary Examiner—Bruce M. Kisliuk
Assistant Examiner—Jack Lavinder
Attorney, Agent, or Firm—William J. Bethurum

[57] ABSTRACT

A method and system for controlling the depth of removal by polishing of a selected material on a supporting underlayer where it is desired to terminate removal of the selected material, such as tungsten, at the material-underlayer interface. In accordance with this novel method and system, the selected material such as a surface metallization layer is polished to initiate removal thereof in the direction of the material-underlayer interface. A microphone is positioned at a predetermined distance from the wafer to sense acoustical waves generated when the depth of material removal reaches a certain determinable distance from the interface to thereby generate output detection signals. These output detection signals are amplified and then applied to a spectrum analyzer which operates to analyze the sound intensity-versus-frequency characteristic of the acoustical waves received by the microphone. The spectrum analyzer operates to drive a CMP computer which in turn controls the operation of a CMP polishing machine. The CMP polishing motor terminates polishing of the selected material a predetermined time after a desired output signals are received from the spectrum analyzer. The present invention is also directed to a method and system or measuring the thickness of certain materials by comparing acoustical signals in a spectrum analyzer with frequency characteristics of known materials of certain layer thicknesses.

13 Claims, 2 Drawing Sheets

ACOUSTICAL METHOD AND SYSTEM FOR DETECTING AND CONTROLLING CHEMICAL-MECHANICAL POLISHING (CMP) DEPTHS INTO LAYERS OF CONDUCTORS, SEMICONDUCTORS, AND DIELECTRIC MATERIALS

TECHNICAL FIELD

This invention relates generally to semiconductor wafer processing techniques using chemical-mechanical polishing and more particularly to a method and system for monitoring the diminished thickness of metals, or dielectrics such as oxides, or other electronic material layers being polished.

BACKGROUND ART

In the manufacture of certain types of integrated circuits (ICs), such as high density dynamic random access memories (DRAMs) or static random access memories (SRAMs), it has been a common practice to deposit selected metals such as tungsten, W, in the form of surface layers on the outer surfaces of integrated circuit wafers. These metal layers extend down into vertical passages such as vias or troughs within the semiconductor wafer to make electrical contact with active devices formed in the underlying semiconductor substrate. For example, a tungsten layer has been deposited by chemical vapor deposition (CVD) on the surface of a titanium or titanium nitride underlayer and into openings (vias). These openings were previously etched through a dielectric underlayer of $SiO_2$ and down to a silicon substrate where the IC active devices have been previously formed. The formation of these IC structures using tungsten plugs is described in more detail, for example, in copending application Ser. No. 07/734,908 of Fernando Gonzeles et al entitled "Self-Aligned Contact Device and Method For Making High Density Electrical Connections Through Semiconductor Memory Cells", filed Jul. 24, 1991, assigned to the present assignee and incorporated herein by reference.

Once electrical contact is made through the tungsten plugs to the active devices within the silicon substrate, it becomes necessary to chemically and mechanically polish the tungsten metal residue from the outer surface of the dielectric substrate (the titanium or titanium nitride underlayer) before proceeding further in the wafer fabrication process. This step is taken in order to reduce the resistivity of the electrical interconnection being made and to thereby improve device switching speed. The above chemical-mechanical polishing (CMP) process will typically use a combination of wet chemical etchant and a motor driven polishing pad to remove the outer tungsten layer down to the tungsten/titanium or titanium nitride interface. This process may also be used to remove other metals such as titanium nitride or titanium to an underlying oxide interface or to another equivalent underlayer.

In the past, in order to determine when the metal (e.g. tungsten)/underlayer (e.g. titanium nitride) interface was reached during the CMP process, the silicon wafer was often physically removed from the CMP machine and then inspected under a microscope to determine if the polished metal layer had been completely removed. Using other prior art layer monitoring techniques, certain contact monitoring methods have been employed which require some physical attachment to either the wafer or the CMP machine or both. Both of these prior methods are very labor intensive, and they have traditionally exhibited a low throughput.

Another, non-contact method for detecting when the metal/underlayer interface has been reached employs laser interferometry techniques. Such techniques require the use of expensive laser beam generation equipment and processing systems and also require both pre-CMP and post-CMP measurements which are also labor intensive. Accordingly, it is the elimination of the disadvantages of the above prior art contact and non-contact metal/underlayer interface monitoring systems and the solutions to the above problems to which the present invention is directed.

DISCLOSURE OF INVENTION

In accordance with the present invention, it has been discovered that the above described metal/underlayer interface depth can be monitored and determined relatively easily without using either of the above prior art contact or laser beam processing methods. This determination is accomplished by the discovery that as the chemical-mechanical polishing of the metal proceeds towards the metal/underlayer interface, certain distinct acoustic waves are generated. These distinct acoustic waves are generated as the polished metal surface approaches within a certain determinable distance of the underlayer surface, or from the metal/underlayer interface. These acoustic waves are then sensed by suitable acoustic wave detection means and are amplified and spectrum analyzed. A spectrum-analyzed-dependent output signal is then applied as an input control signal to a CMP computer which in turn operates to control the length of time that the polishing of the metal layer must continue before the metal/underlayer interface is reached.

Accordingly, it is a principal object of this invention to provide a new and improved method and system for controlling the depth of removal by polishing of a selected material on a supporting underlayer where it is desired to terminate material removal at the material-/underlayer interface.

Another object of this invention is to provide a new and improved method and system of the type described which is not labor intensive.

Another object of this invention is to provide a new and improved method and system of the type described which operates to greatly increase throughputs during the chemical-mechanical polishing phase of the integrated circuit wafer manufacturing process.

Another object of this invention is to provide a new and improved method and system of the type described which does not rely on either laser beam interferometry processing techniques or physical contact layer removal monitoring methods.

A novel feature of this invention is the provision of a new and improved acoustical sensing method of the type described which, in addition to the above interface end-pointing capability, has the ability to determine the thickness of a layer being polished. This is done by sensing the shift in the resonant frequency of the wafer, and also by measuring the amplitude of such resonant frequency.

Briefly summarized and commensurate in scope with the broad claims filed herein, the method and system of the present invention includes means and steps for controlling the depth of removal by polishing of a selected material on a supporting underlayer defining a material- /underlayer interface. This method comprises the steps of polishing the selected material to initiate removal thereof in the direction of the interface, and then sensing acoustic waves generated when the depth of material removal reaches a certain distance from the interface. At this point, certain acoustical signals are generated which are fingerprints of the existent stage of the CMP process. These acoustical signals are then processed in a closed loop fashion to terminate the polishing when the material removal reaches the interface.

The above brief summary of the invention, together with its objects, novel features and attendant advantages, will become better understood with reference to the following description of the accompanying drawings.

DETAILED DESCRIPTION OF THE DRAWINGS

Figure 1A:
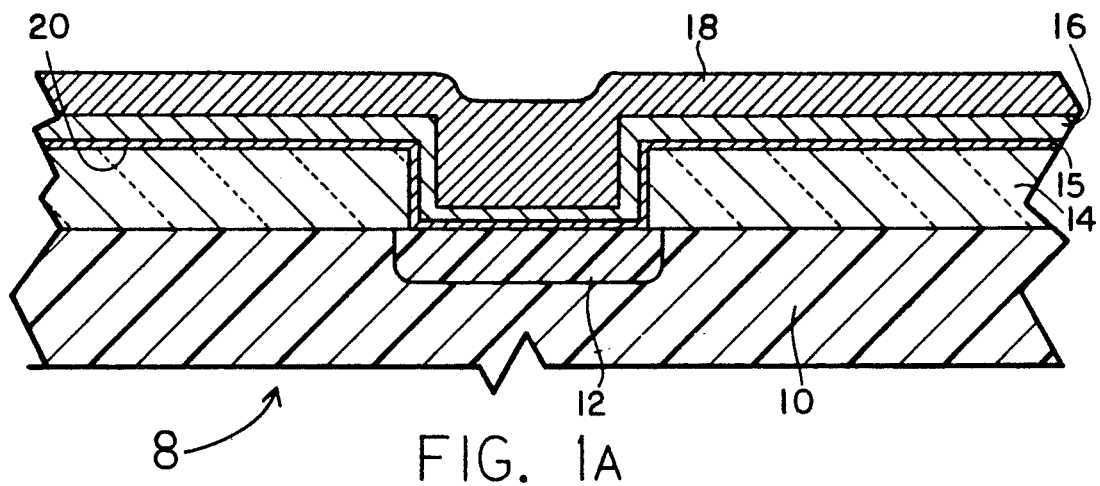
FIGS. 1A and 1B are abbreviated schematic cross section views intended to demonstrate the reason for the CMP removal of IC metal layers using the closed loop process described and claimed herein.
Figure 1B:
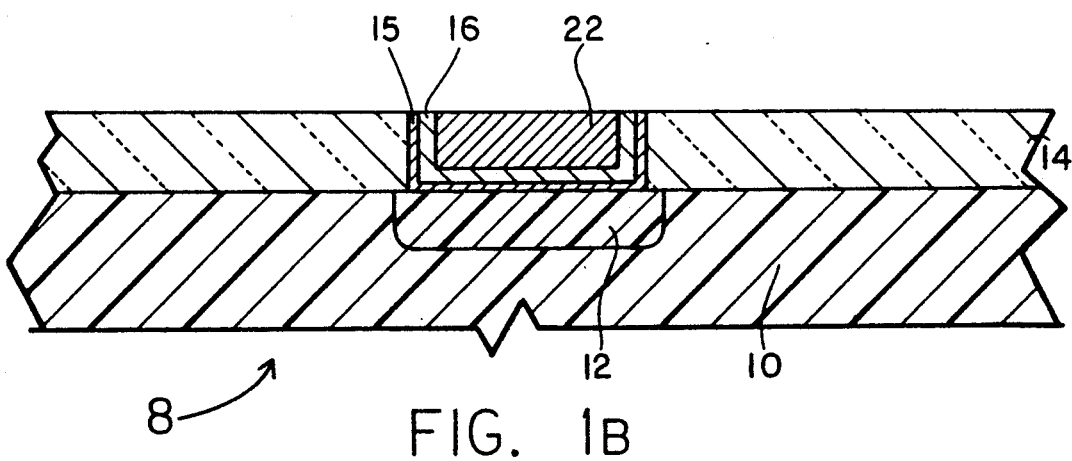

Referring now in sequence to FIGS. 1A and 1B, a fragmented cross section 8 of a typical integrated circuit will include a silicon substrate 10 in which an active device region 12 has been formed using known diffusion or ion implantation techniques. Then, one or more surface layers 14, 15, and 16 are formed on the surface of the silicon wafer 10, and next an outer metal layer 18, such as tungsten, is deposited using chemical vapor deposition (CVD) techniques on the upper surface of the underlayer 16. The underlayer 16 may, for example, be titanium nitride and the thin layer 15 is titanium. The outer layer 18 of tungsten is extended through the opening in the $SiO_2$ underlayer 14, and is deposited on the surface of the TiN layer 16. After the tungsten deposition step forming the metal layer 18 has been completed and electrical contact made to the active device region 12, then it is customary to transfer the structure 8 shown in FIG. 1A to a chemical-mechanical polishing (CMP) station and polish-remove the metallization 18 down to the metal/underlayer interface indicated at 20 in both FIGS. 1A and 1B.

Thus, as shown in FIG. 1B, the upper surface of the silicon dioxide layer 14 is now co-planar with the upper surface 22 of the tungsten remaining in the vertical trough. This trough was previously formed using conventional photolithographic masking and etching techniques through the intermediate $SiO_2$ layer 14. Although the various material layers in FIGS. 1A and 1B are obviously not made to scale, the following are typical layer thicknesses for these devices as they are configured in the manufacture of current state of the art integrated circuits: The silicon substrate will typically be on the order of 600 to 700 microns, whereas the tetraethylorthosilicate (TEOS) layer of silicon dioxide on the surface of the silicon substrate will typically be in the range of 1 to 3 micrometers. The titanium layer 15 which is formed on the surface of the $SiO_2$ layer 14 will generally be in the range of 100 to 500 Angstroms, whereas the titanium nitride layer 16 will typically be in the range of 200 to 800 Angstroms. Finally, the layer 18 of tungsten to be polished as described herein will typically be formed to a thickness of about 10,000 Angstroms, or 1 micrometer on the surface of the TiN layer 16.

Referring now to FIG. 2, the semiconductor wafer 8 is mounted with its metal surface down on the upper surface 24 of a polishing pad 26. The polishing pad 26 is of the type used in conventional CMP polishing stations which will not be described in detail herein. However, these stations do employ known chemical slurries such as a solution of $H_2O$ and $H_2O_2$ containing suspended abrasive particles of aluminum oxide, $Al_2O_3$. These slurries are used in combination with mechanical polishing pads made of microporous, blown polyurethane in order to remove the metal surface layers as previously described. Chemical-mechanical processes of the type with which the present invention is useful are generally well known in the art and are described, for example, in U.S. Pat. No. 4,944,836 issued to K. D. Beyer et al and entitled "Chemical-Mechanical Polishing Method for Producing Co-planar Metal/Insulator Films on a Substrate", issued Jul. 31, 1990, and incorporated herein by reference. CMP methods for polishing tungsten are also described in U.S. Pat. No. 4,992,135 issued to Trung T. Doan and entitled "Method of Etching Back of Tungsten Layers on Semiconductor Wafers and Solution Therefor", assigned to the present assignee and also incorporated herein by reference.

A conventional microphone 28 is positioned as shown within a predetermined distance of about 5 centimeters to 40 centimeters from the wafer 8 and is connected to drive a preamplifier stage 30. The microphone 28 operates to detect acoustical waves which develop a certain sound intensity-versus-frequency characteristic when the metal/underlayer interface is about to be reached in a CMP process. In the audible range (20 Hertz to 20,000 Hertz), conventional microphones such as condenser microphones, pressure gradient microphones, and moving coil electrodynamic microphones can be used. The above mentioned microphones are usually non-contact acoustical transducers and require no attachment to either the wafer or the CMP machine being used.

At higher frequency ranges greater than 20,000 Hertz, contact transducers such as piezoelectric transducers can be used. In this case, an acoustical transducer is placed in contact with either the backside of the wafer being polished, or on the wafer holder which retains the wafer in place during a CMP process. The contact transducer directly measures the acoustical waves generated in the wafer without the need for air coupling. For a further discussion of acoustical transducers of the above types, reference may be made to a book by L. E. Kinsler et al entitled *The Fundamentals of Acoustics*, Third Edition, John Wylie and Sons, Inc., New York, N.Y., York, Copyright 1982, incorporated herein by reference.

In addition to end-point detecting an interface between two dissimilar materials when one material is completely removed from another material during a CMP process, this acoustical technique can also be utilized to determine the remaining thickness of a material being polished. The acoustical waves generated during a CMP process are mainly due to the vibration of the polishing pad and the wafer caused by the frictional forces between these two elements. For a given CMP process, the frequency of the generated acoustical waves is also dependent upon the film thickness on the wafer, since the elasticity of the wafer changes with both the type of film, and also with the thickness of the film on the wafer. Therefore, by measuring the frequency of the acoustical wave generated in a CMP process as a function of a known film thickness, a calibration curve showing acoustical wave frequency as a function of the film thickness can be obtained. In a CMP process using the present invention as a layer thickness measuring technique, the detected acoustical wave frequency is compared with the above calibration curve, and the film thickness can thus be determined.

As a more specific example under certain CMP operating conditions such as a specific CMP oscillation range, certain polishing pad rotational speeds and the like, the frictional force acting on the wafer being polished can excite the wafer to one of its resonant modes. In such case, the resonant frequency varies with the mass of the wafer. Thus, as the wafer is being polished, the resonant frequency will shift and thereby give an indication of the amount of film that has been removed. Just before the removal of the film is complete, the characteristic intensity versus frequency curve shown in FIG. 2B below will change on the CRT screen of the spectrum analyzer and thereby indicate that there is only a very minimal amount of film thickness remaining to be removed by the CMP machine. More specifically, the intensity peaks P1 and P2 shown in FIG. 2B will either disappear in the frequency range or shift to different frequencies. This remaining film thickness will be different for different materials, but will correspond to a predetermined time (such as within the range of 20 to 35 additional seconds) of polishing that the film must be continually polished before the polishing pad and the wafer are separated.

Figure 2A:
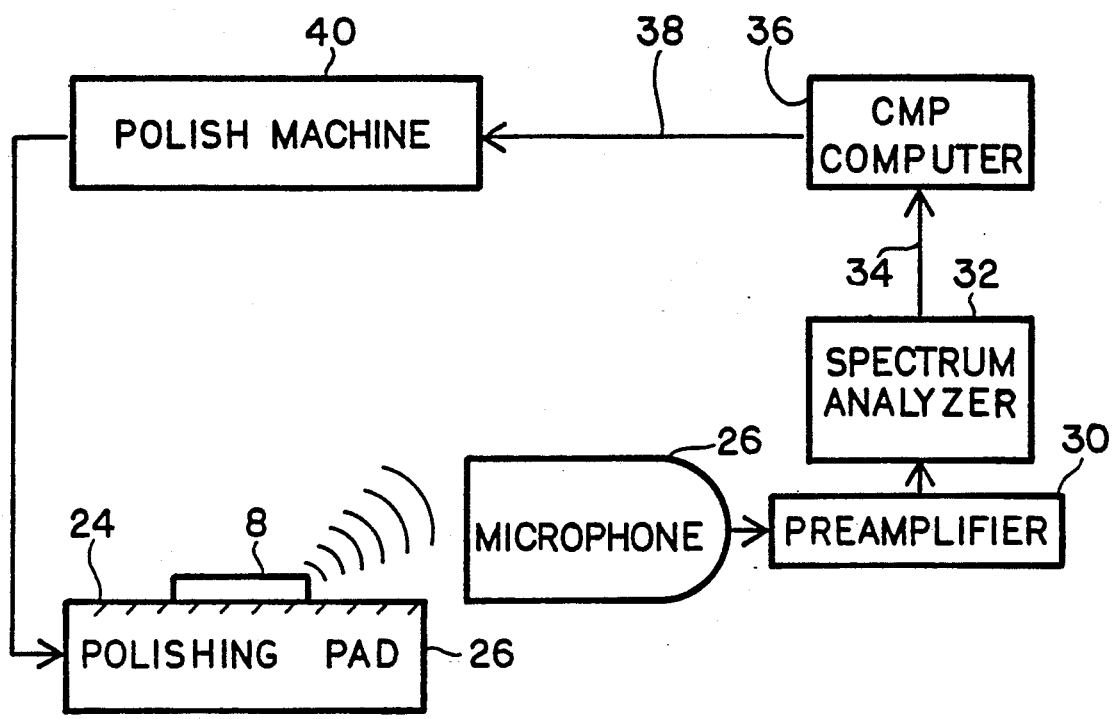
FIG. 2A is a functional block diagram of a preferred embodiment of both the novel method and system of acoustical wave sensing and monitoring of the CMP process in accordance with the present invention.

Continuing now to describe the closed loop CMP polishing process shown in FIG. 2A, the amplified acoustical signal from the preamplifier stage 30 will be fed into a spectrum analyzer stage 32 which will analyze the sound intensity versus frequency characteristic of the received acoustical signal as described above and in turn generate an output control signal on line 34. This control signal is applied as an input signal to a CMP computer 36. The output signal from the CMP computer 36 is in turn applied via line 38 to the CMP machine 40 which will operate to terminate the polishing within a predetermined time after receipt of control signals via line 38 from the CMP computer 36. Using previous trial and error monitoring techniques for the case of a CVD W/TiN/Ti multilayer on a tetraethylorthosilicate (TEOS) substrate and using a $H_2O_2$ based tungsten shurry, it has been determined that once the acoustical waves of a certain sound intensity versus frequency characteristic have been received by the microphone 28, then by polishing an additional twenty (20) to thirty-five (35) seconds after the first audible sound is detected, the residue of metal such as tungsten, titanium, or titanium nitride will be completely cleared from the underlayer on which it was formed.

Figure 2B:
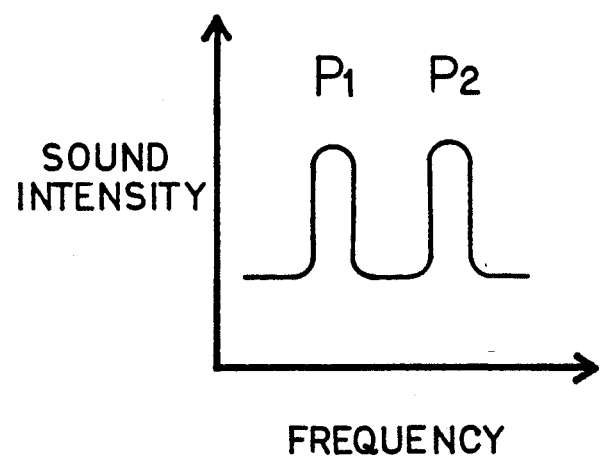
FIG. 2B is a simplified plot of sound intensity versus frequency which is different for different materials being polished and which is analyzed in the spectrum analyzer of FIG. 2A as described in more detail below.

The sound intensity generated during the above CMP process is detected by a high sensitivity microphone 28 and is recorded as a function of frequency. The sound frequency spectrum is shown in FIG. 2B and will typically have some intensity peaks (P1 and P2 in FIG. 2B) over a given acoustical frequency range. The location of these peaks is dependent upon the specific material being polished, and these peaks will shift as a function of layer thickness. These sound intensity versus frequency characteristics are continuously monitored by the spectrum analyzer 32 until a significant change in the sound frequency and amplitude is detected. This change indicates that an end-pointing (interface) is being reached. In addition, for multi-layer CMP polishing, the thickness of the film being polished can be determined in-situ by comparing the detected sound with a prestored frequency spectrum characteristic for each polished material, such as borophosphosilicate glass (BPSG), tungsten, polycrystalline silicon, titanium, titanium nitride, and the like.

Thus, in summary, a major barrier in the past for developing a high throughput, repeatable chemical-mechanical polishing process has been the lack of a simple, real time end-pointing technique to indicate when the surface metal/underlayer interface is being reached. Prior to the present invention, there has been no known effective and accurate technique capable of monitoring and end-pointing a CMP process in-situ. As a result, current prior art CMP processes are very labor intensive and have a low throughput.

However, in accordance with the present invention, a simple, non-contact, and real time end-pointing technique using sound detection (the acoustical frequency spectrum) has been developed for monitoring a CMP process in-situ. The present invention is based on the factual experimental observation that a significant change in the audible sound pitch (acoustical frequency) occurs during the CMP process when an interface between two dissimilar materials is closely reached. The sound observed during these CMP experiments is due to the sound originating from the abrasive force between the wafer surface and the polishing pad contacting it. Specifically, during the CMP polishing of tungsten, when the tungsten layer was polished to the tungsten/silicon dioxide interface, a low frequency audible sound was heard. Based upon the above fact, the novel end-pointing system shown in FIG. 2A and method of operation using the change in sound frequency (acoustical frequency spectrum) were developed.

It should be emphasized here that the method and system in accordance with the present invention is not limited to the use of audible sound only. By using a wide band microphone, both audible (20 Hertz to 20,000 Hertz) sound and non-audible (less than 20 Hertz or greater than 20,000 Hertz) acoustical waves can also be detected using the system shown in FIG. 2A. In addition, for detecting high frequency acoustical waves, contact type, acoustical transducers such as piezoelectric transducers can be used to directly measure the acoustical waves transmitted from the wafer to the wafer carrier, or polishing pad.

Regarding its many advantages over the known prior art in the audible range, the present invention may be practiced using low cost microphones which are commercially available, and this process represents a simple, production worthy approach for end-pointing a CMP process. In addition, by using high sensitivity, wide band microphones, both audible and non-audible acoustic waves of low levels can be detected. Finally, using the microphone detection method described above, the microphone can be placed outside the CMP machine, and no physical attachment to either the wafer or the CMP machine is required.

Various modifications may be made in and to the above described embodiment without departing from the spirit and scope of this invention. For example, the present invention is not limited in any way to the particular metals and insulators described above, and may be employed with other and different metals and insulators used in the semiconductor processing industry. In addition, the present invention is not limited to the particular simplified closed loop functional block diagram shown in FIG. 2A. This closed loop signal processing system may be modified using other different and additional acoustical wave signal processing components available to those skilled in the art. In addition, this system and method are useful in measuring material layer thicknesses as well as controlling the co-planarity of two adjacent layers as described above. Accordingly, these and other method and system modifications are clearly within the scope of the following appended claims.

I claim:

1. A method for controlling the depth of removal by polishing of a selected material on a supporting underlayer where it is desired to terminate removal at the material-underlayer interface, which comprises the steps of:
   a. polishing said material to initiate removal thereof toward said interface,
   b. sensing acoustical waves generated when a thickness of said selected material reaches a certain value,
   c. generating a detection signal in response to the sensed waves, and
   d. processing said detection signal to terminate said polishing when said material is removed from said supported underlayer.

2. The method defined in claim 1 wherein the sensing of said acoustical waves comprises positioning a microphone a predetermined distance from said material-underlayer interface.

3. The method defined in claim 2 wherein the processing of said detection signals includes:
   a. amplifying said detection signals received from said microphone,
   b. analyzing a frequency spectrum and sound intensity versus frequency characteristic of acoustical waves received from said interface to thereby generate output control signals, and
   c. utilizing said output control signals to terminate polishing of said selected material when said material/underlayer interface is reached.

4. The method defined in claim 3 wherein the utilization of said control signals to terminate polishing of said selected material includes the steps of:
   a. applying said control signals to a chemical-mechanical polishing (CMP) computer, and
   b. processing output signals from said chemical mechanical polishing computer to control a chemical-mechanical polishing machine.

5. The method defined in claim 1 wherein said selected material is selected from the group consisting of tungsten, titanium, tantalum, molybdenum, aluminum, titanium nitride, and titanium, and said underlayer is selected from the group consisting of borophosphosilicate glass, polycrystalline silicon, silicon dioxide, silicon nitride, and tetraethylorthosilicate.

6. A system for controlling the depth of removal by polishing of a selected material on a supporting underlayer wherein said selected material and said supporting underlayer define a material-underlayer interface and where it is desired to terminate removal at the material-underlayer interface, including in combination:
   a. means for polishing said material to initiate removal thereof toward said interface,
   b. means adjacent to said polishing means for sensing acoustical waves generated when the thickness of said selected material reaches a certain value,
   c. means coupled to the means for sensing for generating a detection signal in response to the sensed waves, and
   d. means coupled to said generating means for processing said detection signal to terminate said polishing when said material is removed from said supporting underlayer.

7. The system defined in claim 6 wherein said means for sensing of said acoustical waves comprises a microphone located a predetermine distance from said material-underlayer interface.

8. The system defined in claim 7 wherein said means for processing of said detection signals includes:
   a. means for amplifying said detection signals received from said microphone,
   b. means coupled to said amplifying means for analyzing a frequency spectrum and sound intensity versus frequency characteristic of acoustical waves received from said microphone to thereby generate output control signals, and
   c. means coupled to said analyzing means for utilizing said output control signals to terminate polishing of said selected material when said material/underlayer interface is reached.

9. The system defined in claim 8 wherein said utilizing means includes:
   a. means for applying said control signals to a chemical-mechanical polishing computer, and
   b. means connected to said computer for processing output signals from said computer to control a polishing motor used, in polishing said selected material.

10. The system defined in claim 9 wherein said means for sensing said acoustical waves comprises a microphone located a predetermined distance from said material/underlayer interface and which is operated in the range of 20 Hertz to 20,000 Hertz.

11. The system defined in claim 9 wherein said means for sensing acoustical waves comprises a contact acoustical transducer such as a piezoelectric transducer attached to a wafer backside or wafer holder which holds the wafer in place during a CMP process.

12. The system defined in claim 6 wherein said means for sensing said acoustical waves comprises a microphone located a predetermined distance from said material/underlayer interface and which is operated in the range of 20 Hertz to 20,000 Hertz.

13. The system defined in claim 6 wherein said means for sensing acoustical waves comprises a contact acoustical transducer such as a piezoelectric transducer attached to a wafer backside or wafer holder which holds the wafer in place during a CMP process.

* * * * *